(12) United States Patent
Sedlak

(10) Patent No.: US 6,487,470 B1
(45) Date of Patent: Nov. 26, 2002

(54) METHOD AND APPARATUS FOR DETERMINING MAGNET WIRE PRODUCTION DIE SETS

(75) Inventor: John Michael Sedlak, Shreveport, LA (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 09/618,255

(22) Filed: Jul. 18, 2000

(51) Int. Cl.⁷ .............................................. G06F 19/00
(52) U.S. Cl. ......................... 700/97; 700/150; 428/383
(58) Field of Search ......................... 700/97, 172, 150, 700/204; 428/383

(56) References Cited

U.S. PATENT DOCUMENTS

| | | | |
|---|---|---|---|
| 4,378,407 A | * 3/1983 | Yamamoto et al. | 174/110 N |
| 4,388,371 A | 6/1983 | Bolon et al. | 118/620 |
| 4,393,809 A | 7/1983 | Hilker | 118/620 |
| 5,535,612 A | 7/1996 | Vijayakar | 72/43 |
| 5,882,559 A | 3/1999 | Eckardt et al. | 264/45.1 |
| 6,247,629 B1 | 6/2001 | Jacobson et al. | 228/4.5 |

* cited by examiner

Primary Examiner—Leo Picard
Assistant Examiner—Kidest Bahta
(74) Attorney, Agent, or Firm—Karl Vick, Esq.; Armstrong Teasdale LLP

(57) ABSTRACT

A method for determining optimum enamel die sizes for each of a plurality of dies for fabricating magnet wire includes a series of calculations based upon an empirically determined build factor for each of the enamel coatings used in the fabrication process. The build factor is a measure of the effective diameter increase of a wire passed through a coating die when the diameter of the wire entering the die is known and a selected thickness of wet enamel coating exiting the die is known. The build factor a given enamel coating is primarily dependent upon only the solids content of the enamel coating solution, and is largely independent of the chemistry of the coating solution. A simple relationship between build factor, die size, and wire size allows consistent fabrication of magnet wire in accordance with preselected specifications and with virtually no scrapped wire due to oversized final wire diameters.

15 Claims, 6 Drawing Sheets

METHOD AND APPARATUS FOR DETERMINING MAGNET WIRE PRODUCTION DIE SETS

BACKGROUND OF THE INVENTION

This invention relates generally to a method and apparatus for predicting final coating thickness of articles fabricated in multi-stage, successive coating processes and for selecting appropriate die sizes for producing the same, and more particularly, to a method and apparatus for predicting final coating thickness of magnet wire fabricated with multi-stage undercoating and overcoating operations and for selecting optimum die sizes for multi-stage production of magnet wire.

Some articles of manufacture, such as for example, magnet wire used in a manufacture of AC induction motor windings, are fabricated in multiple and successive coating stages. For instance, at least one type of magnet wire includes a copper or aluminum wire coated with, for example, four undercoat layers of a first enamel material and two overcoat layers of second enamel material to insulate and protect the wire and provide the wire with desirable properties for use in motor winding fabrication for AC and DC motors. The undercoat and overcoat layers are successively formed in coating stations that each include a die having a throat of a given diameter that controls a thickness of the enamel coating upon a wire passed through the die. The application of multiple coatings through a plurality of dies is well known in the art. One such apparatus and method for manufacturing such magnet wire is described in U.S. Pat. No. 4,393,809.

Typically, due to difficulties in predicting a final wire diameter after a plurality of coating stages, and further to compensate for manufacturing variability, enamel coatings are applied in excess to ensure that at least a minimum enamel coating thickness is achieved. This typically includes the use of oversized dies, and the sizes of the dies used is often empirically determined by trial and error to consistently achieve specified coating thickness minima. Even so, variability in final wire diameters results in an appreciable amount of wire being scrapped for excessive final diameters, i.e., excessive coating thicknesses. For example, in at least one manufacturing plant, enamel builds averaged 135–140% of specification minima for esterimide amideimide coated M-range copper and aluminum wires, and approximately 10,000 lbs of wire per month was scrapped for oversized final diameter. Thus, not only does the excess enamel coating increase manufacturing costs of magnet wire, but also contributes to unusable product that is ultimately scrapped.

Accordingly, it would be desirable to provide an apparatus and method for predicting final wire diameter of magnet wire produced from a given set of dies in multi-stage coating operations, and further to provide a methodology and apparatus for selecting die sizes to more efficiently achieve a uniformly acceptable final wire diameter with reduced amounts of coating and reduced scrap of the final product. Therefore, manufacturing input of enamel coating may be reduced and production costs of magnet wire lowered.

BRIEF SUMMARY OF THE INVENTION

A method for determining optimum enamel die sizes for each of a plurality of dies for fabricating magnet wire includes a series of calculations based upon an empirically determined build factor for each of the enamel coatings used in the fabrication process. The build factor is a measure of the effective diameter increase of a wire passed through a coating die when the diameter of the wire entering the die is known and a selected thickness of wet enamel coating exiting the die is known.

Notably, the build factor for a given enamel coating is primarily dependent upon only the solids content of the enamel coating solution. Significantly, it is largely independent of the chemistry of the coating solution. Thus, using only three variables, namely the initial or bare wire diameter, the die size or, more specifically, the size of a restricted opening through the die that governs the coating thickness of wire passed through the die, and the build factor of the applied enamel coating, a relatively simple relationship between a final wire diameter after curing and the die size is expressed as follows:

$$D_{pf(n)} = D_{0(n)} + K_{pass(n)}(D_{die(n)} - D_{0(n)})$$

where $D_{pf(n)}$=final wire diameter after the nth pass;
$D_{0(n)}$=initial wire diameter at the nth stage;
$K_{pass(n)}$=build factor for the nth pass; and
$D_{die(n)}$=die throat diameter of the nth stage.

By manipulating this relationship, die set sizes can be selected and enamel build accurately predicted at each of a plurality of fabrication stages through multiple coating dies. Wire is fabricated in accordance with pre-selected specifications with reduced amounts of enamel coating and with virtually no scrapped wire due to oversized final wire diameters.

More specifically, a target final diameter of the magnet wire is calculated after completion of undercoat and overcoat operations, and a target incremental diameter build at each undercoat and overcoat stage of magnet wire production is computed based upon initial wire diameter entering the respective manufacturing stage. The incremental diameter builds are dependent upon the respective target final or overall undercoat diameter for all undercoating stages, the final overall or target overcoat diameter for all overcoating stages, and the number of dies used in the respective undercoating and overcoating fabrication process.

An enamel die size is then computed at each undercoat and overcoat stage of magnet wire production based upon initial wire diameter entering the respective stage, the incremental diameter build for the respective stage, and the build factor for the enamel applied at each respective stage. Die sizes and enamel builds are computed iteratively until an complete die set is found to consistently produce magnet wire within acceptable specification limits while using reduced amounts of enamel coating material.

Therefore, a systematic approach is provided to reduce production costs of articles manufactured in multi-stage coating processes within specification limits.

DETAILED DESCRIPTION OF THE INVENTION

Figure 1:
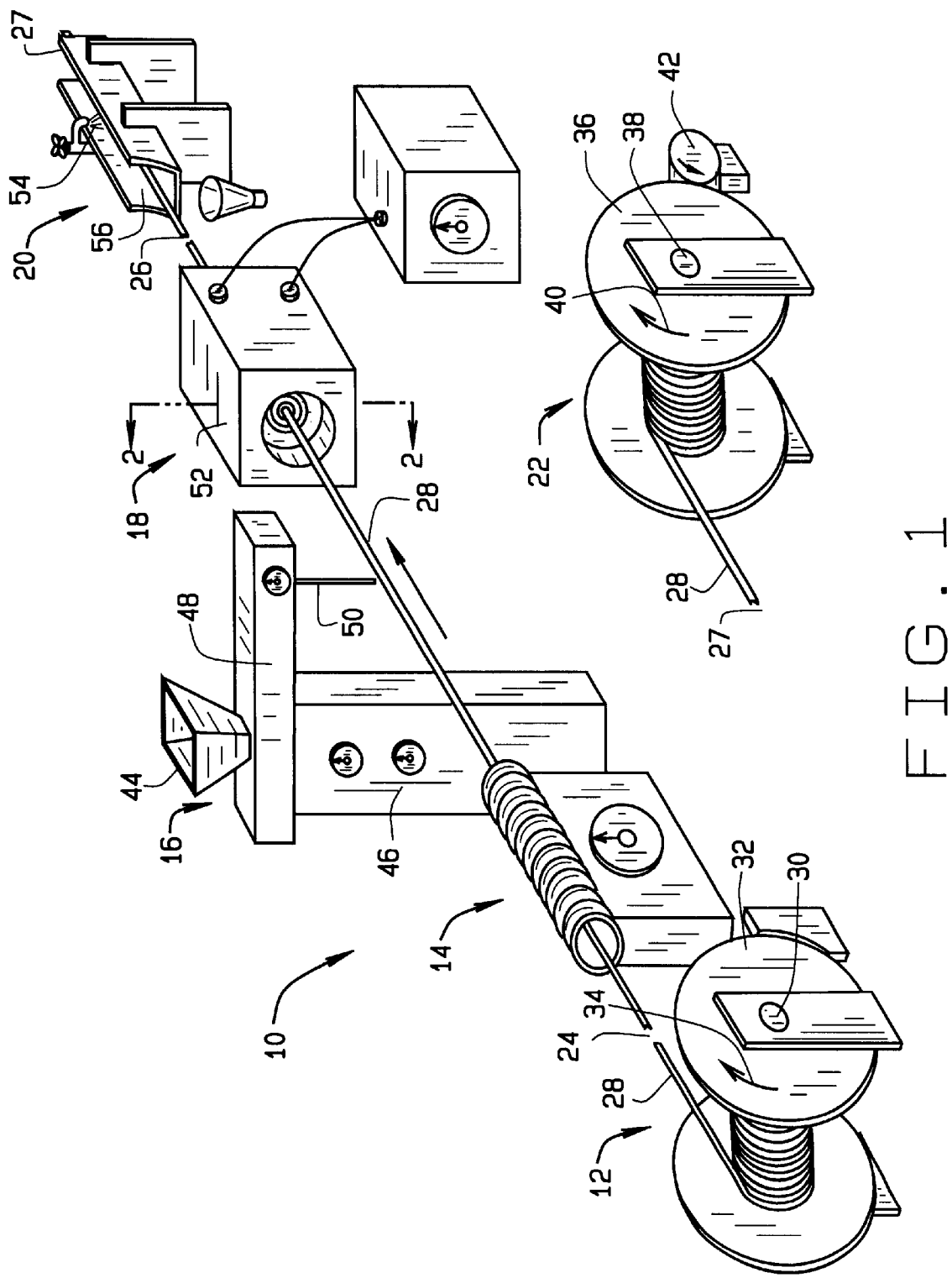
FIG. 1 is a perspective, fragmented, diagrammatical view of an exemplary apparatus for producing magnet wire.

FIG. 1 is an exemplary known apparatus 10 for producing magnet wire in a multi-stage coating process. It is recognized that other devices for producing magnet wire are also known and to which the present invention applies. Therefore, apparatus 10 is intended to describe the invention by way of illustration only and not by limitation.

Apparatus 10 includes a nominal bare wire supply 12, a heater 14, a coating dispenser 16, a coating die 18, a hardener 20, and a wire collector 22. A known wire drawing apparatus (not shown) is inserted at wire break 24, and additional heaters (not shown), additional coating dispensers (not shown), additional coating dies (not shown) and additional hardeners (not shown) are inserted at wire break 26 in spaced apart fashion so that successive enamel coats may be applied to wire 28 in a continuous process. Hardener 20 and wire collector 22 are connected through wire break 27.

Wire supply 12 includes a wire spool 30 mounted on a spindle 32 for rotational movement of spool 30 in a direction of arrow 34. Wire collector 22 also includes a wire spool 36 mounted to a spindle 38 for rotational movement of spool 38 in a direction of arrow 40. Wire collector 22 is rotationally driven by a driver element 42, and pulls wire 28 from wire supply 12 to wire collector 22 through heater 14, coating dispenser 16, coating die 18, and hardener 20.

Heater 14 raises a temperature of wire 28 prior to application of an enamel coating and/or to reduce effects of rolling or drawing of wire 28 from wire supply 12. Coating dispenser 16 includes a loading chute 44 and a material reservoir 46 for storing material loaded into chute 44, such as enamel coating solutions. A pump 48 dispenses coating material through a nozzle 50 onto wire 28 at a controlled rate depending upon applicable coating material viscosity and flow conditions. The coated wire is passed through a coating die 52 which removes excess coating from wire 28 for a controlled thickness of coating exiting coating die 52, as further described below. Hardener 20 hardens a remaining coating after wire is passed through coating die 52 and includes a cooling water spray 54 and trough 56 adapted for quenching coated wire passed through coating die 52. In alternative embodiments, hardener 20 includes cooling fluid sprays without quenching the coated wire, and in further alternative embodiments, includes convective air flow at ambient or controlled temperatures to harden, or cure, the enamel coating after wire 28 is passed through coating die 52.

Figure 2:
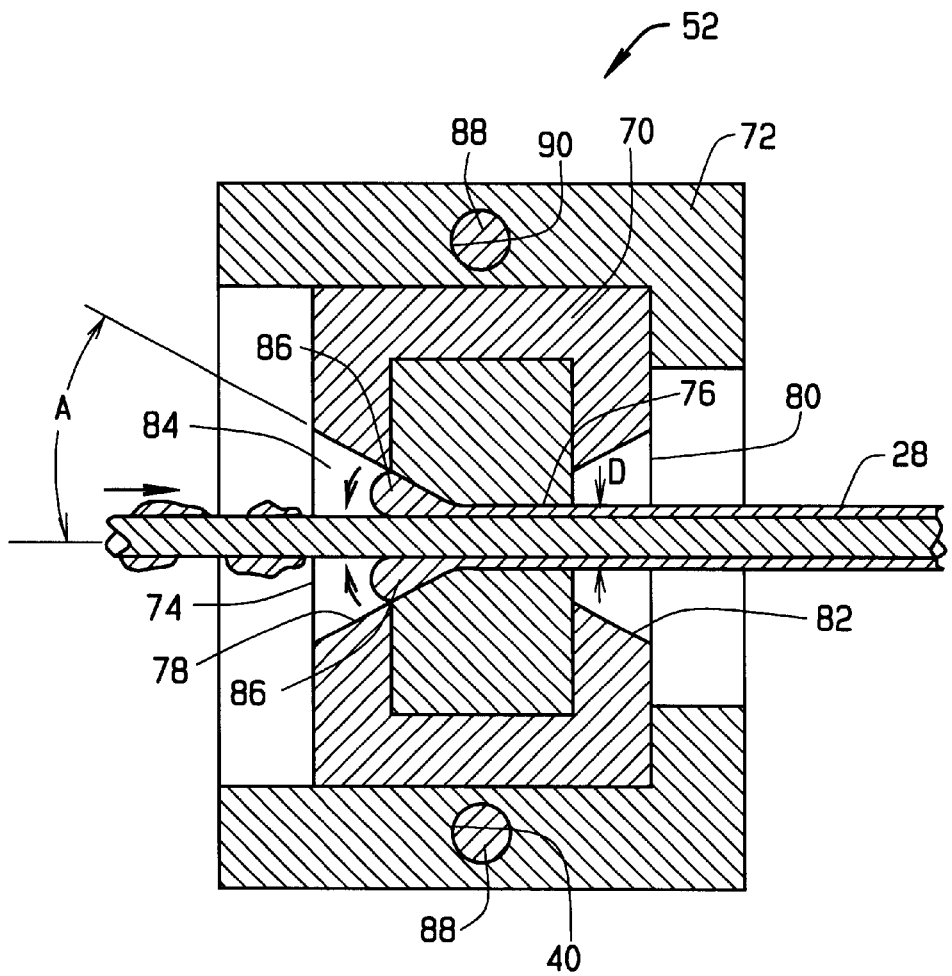
FIG. 2 is a cross sectional view of a coating die along line 2—2 of FIG. 1.

FIG. 2 is a cross sectional view of exemplary coating die 52 including a die 70 mounted in a die box 72. Die 70 includes an entrance opening 74, a throat 76, and a converging interior wall 78 connecting throat 76 and entrance opening 74, an exit opening 80, and a diverging wall 82 connecting throat 76 and exit opening 80. As wire 28 passes through die 70 from coating dispenser 16 (shown in FIG. 1), excess coating 86 fills a die cavity 84 formed by interior converging wall 78 extending between entrance opening 74 and throat 76. Coating material 86 within die cavity 84 centers wire 28 within throat 76 when a temperature of coating material 86 is raised by heaters 88 situated in heater bores 90 of die 70 to provide necessary flow characteristics of coating material 86 to center wire 28 within die throat 76. In alternative embodiments, other known centering mechanisms are employed.

Die throat 76 wipes an excess of coating material 86 from wire 28 as it passes through die cavity 84. Therefore, a size of die throat 76, or a diameter D of die throat 76 when forming cylindrical shaped wire, is a controlling factor for an ultimate coating diameter after wire 28 passes through die 70. Consequently, die throat 76 diameter D varies in accordance with wire size and a desired coating thickness. Conventionally, a size of each of a plurality of coating dies (not shown) used in multi-stage coating operations has been empirically determined based upon geometric considerations, such as the relative cross sectional areas of the dies and the wire passed through them. Experimental determination of die sizes is an inefficient process to arrive at die sizes that consistently achieve at least a minimum specified undercoat and overcoat thickness, and even then, manufacturing variability results in an appreciable amount of scrapped wire due to oversized final diameters, i.e., final diameters greater than specification maximums. Empiricism is especially prevalent when enamel coatings of different compositions are used in different coating stages, which also tends to increase variability of the final product.

Figure 3:
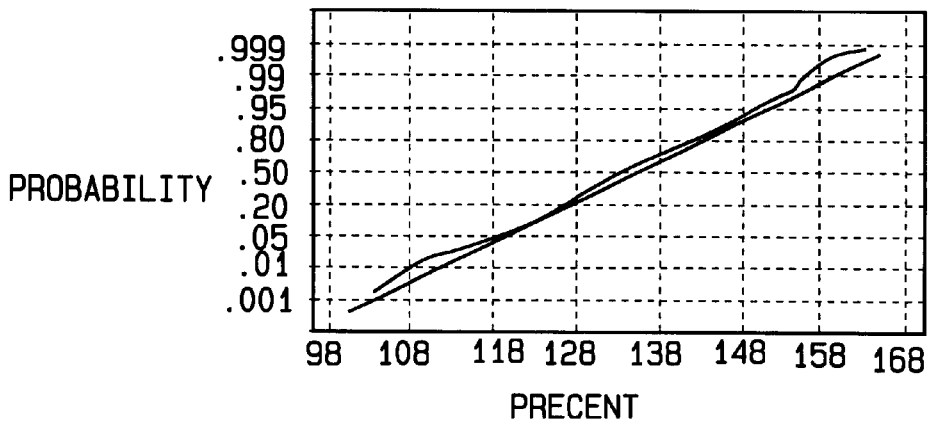
FIG. 3 is a chart illustrating magnet wire variability using conventional magnet wire production methods.

FIG. 3 is a chart illustrating magnet wire variability using conventional magnet wire production methods at a manufacturing facility. Premium grade copper and aluminum magnet wire includes an esterimide undercoat and an amideimide overcoat enamel, for example an undercoat thickness of about 0.0015 inches to about 0.0022 inches and an overcoat thickness of about 0.0004 inches to about 0.0005 inches for 14 gauge to 24 gauge wire. Percent of specification minimum coating thickness, or build, is plotted on the horizontal axis, and probability is plotted on the vertical axis for esterimide amideimide coated copper and aluminum wires of various diameters. Measurements were taken with laser mics from 768 wire spools both before and after stripping enamel build off of the wire to measure coating thickness. It is seen from FIG. 3 that enamel builds averaged 135% to 140% of specification minima, and more specifically about 137%, to guard against product variability, avoid complications due to rough bare wire surfaces, and to avoid dielectric strength issues. A 37% excess, however, adds an appreciable margin of cost to magnet wire production.

It has been observed, however, that enamel coat excesses can be reduced and final coating builds closely controlled and predicted if an enamel coating build factor is determined for each coating used in a coating operation. Build factor is defined as a fraction of wet enamel build leaving a coating die, such as coating die (shown in FIG. 1) which remains after evaporation of solvent and after the coating is cured at each coating pass. In other words, the build factor is a measure of the effective final diameter increase for a given coating thickness of wet enamel remaining on a wire after passing through a coating die. If the applicable build factors are known for the enamel coatings used in a multi-stage coating operation, a size of each of a plurality of coating dies can be calculated to coat magnet wire of a given bare wire diameter to a selected coating thickness, and total enamel build thickness can be accurately predicted, both incrementally at each coating stage and cumulatively for all coating stages.

Figure 4:
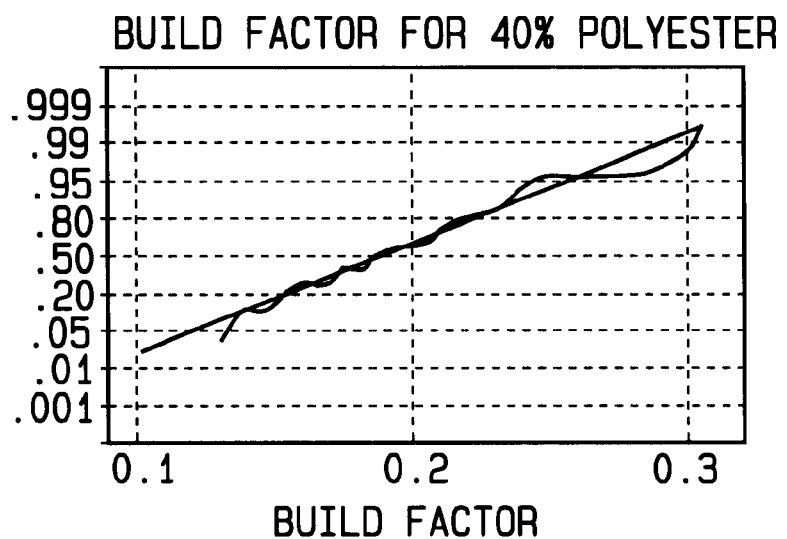
FIG. 4 is a build factor probability chart for a first enamel coating composition.

FIG. 4 is a build factor probability chart for an empirically determined build factor of 40% polyester enamel coating solution. Measurements were taken with laser mics on running wire. A mean build factor for the 40% polyester enamel coating solution was determined to be about 0.19, with some variability in the measurements primarily due to variations in coating die throat diameters. However, over a large population of dies the mean die size is very close to nominal.

Figure 5:
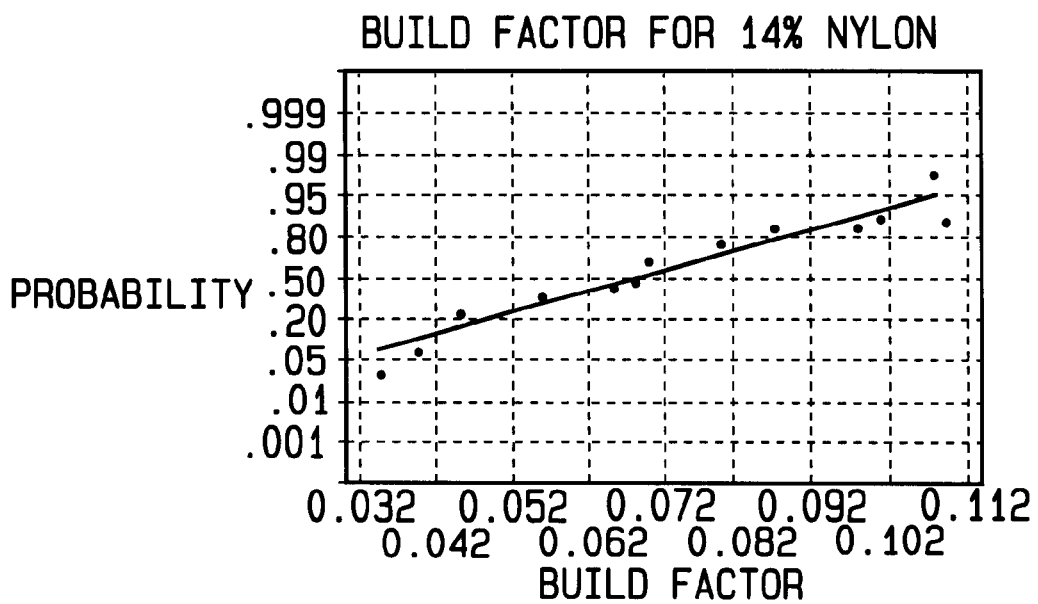
FIG. 5 is a build factor chart for a second enamel coating composition.

FIG. 5 is a build factor chart similar to FIG. 4 but for a 14% nylon enamel solution.

Figure 6:
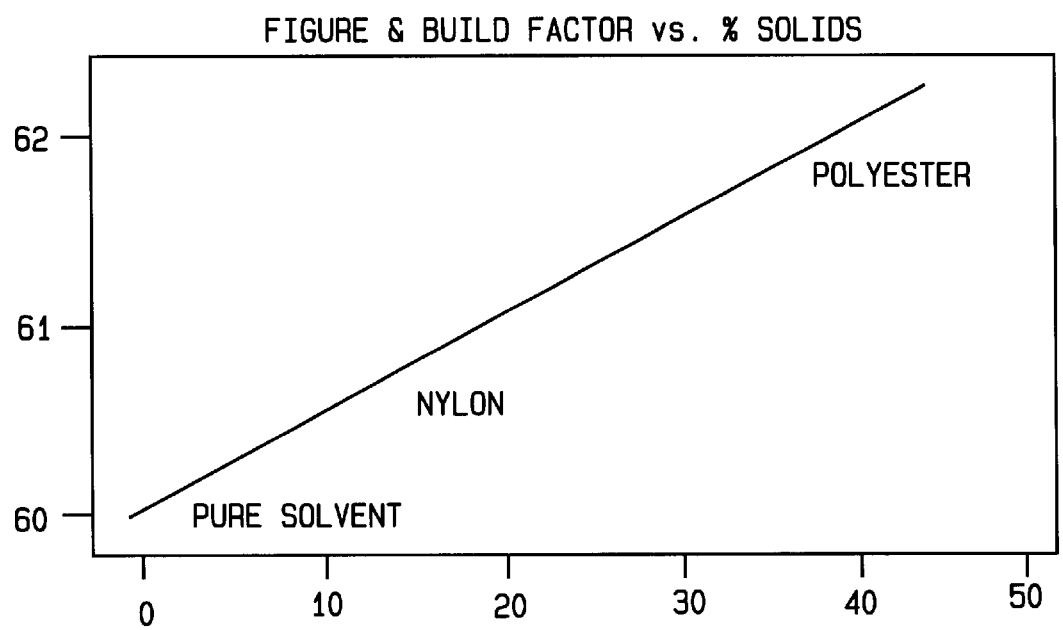
FIG. 6 is a build factor plot for a variety of coating compositions.

FIG. 6 is a build factor plot for a variety of coating compositions of different chemistries. It is seen from FIG. 6 that build factor is linear with respect to percent solids content and is generally insensitive to solids chemistry. Thus, a build factor can be predicted for a given enamel coating composition based only upon knowledge of percent solids in the solution. This observation greatly simplifies enamel coating thickness prediction and die set size selection, which previously was considered a multi-faceted problem dependent upon many variables whose interactions were not possible to quantify.

Figure 7:
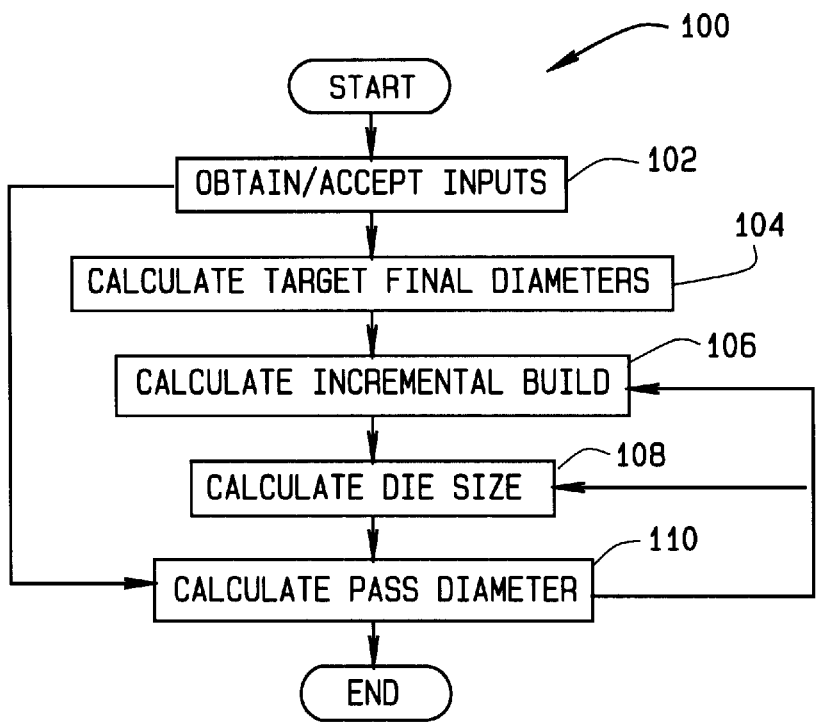
FIG. 7 is method flowchart for predicting final magnet wire diameter and for selecting die sizes.
Figure 8:
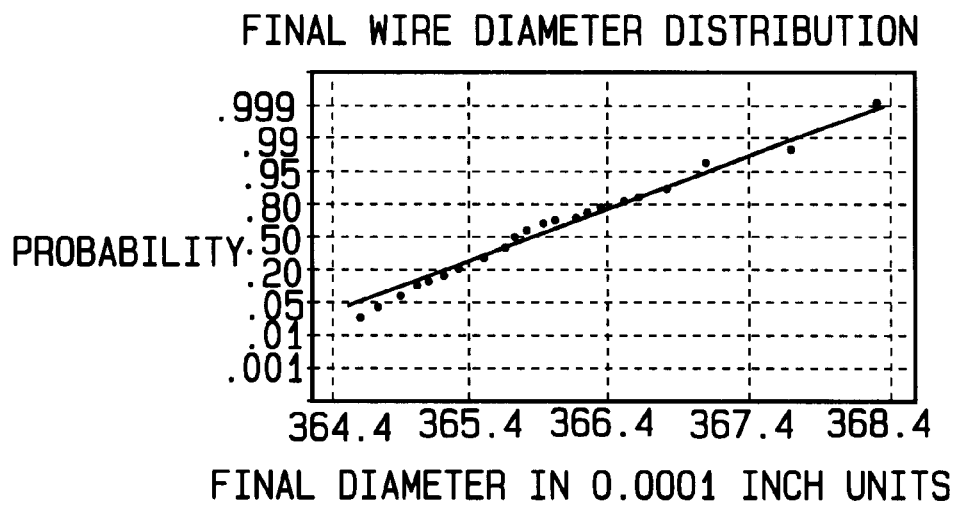
FIG. 8 is an exemplary final wire diameter variability chart for magnet wire produced according to the present invention.

FIG. 7 is method for chart for predicting final magnet wire diameter and for selecting die sizes to achieve tightly controlled final wire diameters at or above a specified minimum coating thickness with a reduced amount of enamel coating and while practically eliminating product scrap due to oversized final diameters. Method 100 includes obtaining 102 the controlling input variables to calculate die set sizes and enamel coating thickness predictions, which have been found to include bare wire diameter, specification criteria (e.g., minimum coating thickness, maximum coating thickness, and percent margins for undercoat and overcoat enamel coating applications to minimize effects of product variability and to consistently produce wire of at least a minimum coating thickness), and the build factor for each enamel coating used in any of the undercoating and overcoating stages. Once these inputs are determined or obtained, they are input, for example, into a system (not shown in FIG. 7) for manipulating data. Target final diameters are then calculated 104 from the inputs, incremental diameter builds are calculated 106 for each of "n" dies for the undercoating and overcoating stages based upon the target diameters and the build factor, die sizes are calculated 106 based upon the incremental builds, and a final diameter for each pass is calculated 110 based upon the calculated die sizes. The iterative process of steps 102, 104, 106, 108, and 110 are explained in detail below, and it will be apparent that method 100 is but one exemplary scheme of computing desired die set information based upon the relationships set forth below. Also, the process is described in an illustrative context of computing die sizes for four undercoat dies and two overcoat dies according to selected specifications in a six-stage, or six pass, coating process. It is contemplated, however, that method 100 is applicable to fabrication process having greater or fewer than four undercoat stages and five overcoat stages.

Calculation 102 of respective target final diameters at a conclusion of undercoating and overcoating stages is accomplished according to the following relationships:

$$D_{Uf} = D_0 + K_{Um}\left(1 + \frac{K_p}{100}\right)$$ (Eq. 1)

where $D_{Uf}$=final wire diameter after all undercoats;
$D_0$=initial bare wire diameter;
$K_{Um}$=specified (min) undercoat build; and
$K_p$=specified percent excess undercoat build.

$$D_{Of} = D_{Uf} + L_{Om}\left(1 + \frac{L_p}{100}\right)$$ (Eq. 2)

where $D_{Of}$=final wire diameter after all overcoats;
$D_{Uf}$=final bare wire diameter after undercoats;
$L_{Om}$=specified (min) overcoat build; and
$L_p$=specified percent excess overcoat build.

In an exemplary calculation in units of 0.0001 inches for clarity and simplification of math where $D_0$=907, $K_{Um}$=11, and $K_p$=20, then $D_{Uf}$=920.2 or 0.09202 inches. Likewise, when $D_{Uf}$=920.2, $L_{Om}$=4, and $L_p$=20, then $D_{Of}$=925.0 or 0.09250 inches. Because the initial bare wire diameter is 907, it is seen in this example that the total target undercoat build is 920.2 minus 907 or 13.2 (0.00132 inches), and the total target overcoat build is 925 minus 920.2 or 4.8 (0.0048 inches). In a remainder of the exemplary calculation sets forth herein, 0.0001 inch units are used except as otherwise indicated.

In a multi-stage coating fabrication process, the individual coating thickness contribution of the plurality of dies is nonlinearly cumulative as the wire is passed through successive coating dies. However, once the target undercoat diameter $D_{Uf}$ and target overcoat diameter $D_{Of}$ are computed, a theoretical cumulative incremental diameter build can be calculated 106, or predicted, for each of "n" undercoat and overcoat stages according to the following relationship:

$$D_{i(n)} = D_{0(n)}\left(\frac{D_f}{D_{0(n)}}\right)^{1/N_r}$$ (Eq. 4)

where $D_{i(n)}$=theorized diameter at the nth stage;
$D_{0(n)}$=initial wire diameter at the nth stage;
$D_f$=final undercoat or overcoat wire diameter; and
$N_r$=number of remaining passes at the nth stage.

Continuing with the previous example, incremental diameter build calculations are as follows for an undercoat formed in four passes through four dies. For the first undercoat die pass, $D_{0(1)}$=initial wire diameter=907, $D_f$=$D_{Uf}$=920.2, and $N_r$=4, so $$D_{i(1)} = 907\left(\frac{920.2}{907}\right)^{1/4} = 910.3 \text{ or } 0.09103 \text{ inches.}$$

For the second undercoat die pass, $D_{0(2)=Di(1)}$=910.3, $D_f$=$D_{Uf}$=920.2, and $N_r$=3, so $$D_{i(2)} = 910.3\left(\frac{920.2}{910.3}\right)^{1/3} = 913.8 \text{ or } 0.09108 \text{ inches.}$$

For the third undercoat die pass, $D_{0(3)}$=$D_{i(2)}$=913.8, $D_f$=$D_{Uf}$=920.2, and $N_r$=2, so $$D_{i(3)} = 913.8 \left(\frac{920.2}{913.8}\right)^{1/2} = 919.9 \text{ or } 0.09199 \text{ inches.}$$

For the fourth undercoat die pass, $D_{0(4)}=D_{i(3)}=919.9$, $D_f=D_{Uf}=920.2$, and $N_r=1$, so $$D_{i(4)} = 919.9 \left(\frac{920.2}{919.9}\right)^{1/1} = 920.2 \text{ or } 0.09202 \text{ inches.}$$

Sizes of the plurality of dies can then be calculated using the incremental diameter builds $D_{(i)1}$, $D_{(i)2}$, $D_{(i)3}$, ... $D_{(i)N}$ where N is the number of undercoat dies. Because the build factor K is defined as the fraction of wet enamel build leaving a coating die that remains on the wire after evaporation of solvent and curing of the enamel, a passing of the wire through an nth die is characterized by the following relationship:

$$\begin{aligned}D_{pf(n)} &= D_{0(n)} + K_{pass(n)}(D_{die(n)} - D_{0(n)}) \\ &= D_{0(n)}(1 - K_{pass(n)}) + K_{pass(n)} D_{die(n)}\end{aligned} \quad \text{(Eq. 5)}$$

where $D_{pf(n)}$=final wire diameter after the nth pass;
$D_{0(n)}$=initial wire diameter at the nth stage;
$K_{pass(n)}$=build factor for the nth pass; and
$D_{die(n)}$=die throat diameter of the nth stage.

Equation (5) may also be solved to calculate 108 a die size. Rewriting Equation (5) reveals that:

$$D_{die(n)} = \frac{D_{pf(n)}}{K_{pass(n)}} + D_{0(n)} - \frac{D_{0(n)}}{K_{pass(n)}} \quad \text{(Eq. 6)}$$

Scrutiny of Equations (4) and (5) reveals that $D_{pf(n)}$ and $D_{i(n)}$ are alternative expression of the same quantity. In other words $D_{pf(n)}=D_{i(n)}$. Therefore, continuing the previous example, in a first undercoat pass where $D_{0(1)}=907$, $D_{pf(1)}=D_{i(1)}=910.3$ and the undercoat build factor is 0.128, then $$D_{die(1)} = \frac{910.3}{0.128} + 907 - \frac{907}{0.128} = 932.781 \text{ or } 0.0932781 \text{ inches.}$$

Because mill convention is to identify die sizes in units of 0.001 inches, convention dictates that $$D_{die(1)}=932.781 \times 0.1=93.2781.$$

Conventional dies size designations are nominal and therefore include a range of actual sizes encompassed by a designation. For example, the following table illustrates some exemplary size ranges for several die size designations:

| Die Size Designation | Actual Die Size In 0.001 Inch Units |
|---|---|
| 93 | 92.75–93.25 |
| 93.5 | 93.26–93.74 |
| 94 | 93.75–93.25 |

Therefore, it may be seen that, after conversion from 0.0001 inch units to 0.001 inch units, the exemplary computed $D_{die(1)}=932.781 \times 0.1=93.2781$ is encompassed by the size range of a 93.5 die. However, a proper size designation can be determined automatically without regard to a look-up of the appropriate die size designation by multiplying the computed die size by two, rounding the result to the nearest integer, and then dividing the integer by two to determine the proper die size designation. Thus, $$D_{size(1)} = \frac{INT(93.2781 \times 2)}{2} = \frac{INT(186.56)}{2} = \frac{187}{2} = 93.5.$$

Final wire diameter after the first pass through the first die can be calculated 110 according to Equation (5) which reveals that the coated wire diameter after the first pass through a die of size designation 93.5, in units of 0.0001 inches, is:

$$D_{pf(1)}=D_{0(1)}+K_{pass(1)}(D_{size(1)}-D_{0(1)})=907+0.128(935-907)=910.6$$

In light of the unit conversion in the exemplary calculations above and further in light of the automatic die size computational method described above, Equation (6) can be modified to directly calculate 108 or determine a conventional die size designation as follows:

$$D_{Size(n)} = \frac{Int\left[0.2\left(\frac{D_{i(n)}}{K_{(n)}} + D_{0(n)} - \frac{D_{0(n)}}{K_{(n)}}\right)\right]}{2} \quad \text{(Eq. 6)}$$

Therefore, continuing the exemplary calculations from above, for the second pass where $D_{0(2)}=D_{pf(1)}=910.6$, $D_{i(2)}=913.8$ and the undercoat build factor is 0.128, then $$D_{Size(2)} = \frac{Int\left[0.2\left(\frac{913.8}{0.128} + 910.6 - \frac{910.6}{0.128}\right)\right]}{2} = \frac{INT(186.81)}{2} = \frac{187}{2} = 93.5$$

and the corresponding coated wire diameter after the second pass through another 93.5 die is $$D_{pf(2)}=D_{0(2)}+K_{pass(2)}(D_{size(2)}-D_{0(2)})=910.6+0.128(935-910.6)=913.7.$$

For the third pass where $D_{0(3)}=D_{pf(2)}=913.7$, $D_{i(3)}=916.9$ and the undercoat build factor is 0.128, then $$D_{Size(3)} = \frac{Int\left[0.2\left(\frac{916.9}{0.128} + 913.7 - \frac{913.7}{0.128}\right)\right]}{2} = \frac{INT(187.80)}{2} = \frac{188}{2} = 94$$

and the corresponding coated wire diameter after the third pass through the third die is $$D_{pf(3)}=D_{0(3)}+K_{pass(3)}(D_{size(3)}-D_{0(3)})=913.7+0.128(940-913.7)=917.1.$$

For the fourth pass where $D_{0(4)}=D_{pf(3)}=917.1$, $D_{i(4)}=920.2$ and the undercoat build factor is 0.128, then $$D_{Size(3)} = \frac{Int\left[0.2\left(\frac{920.2}{0.128} + 917.1 - \frac{917.1}{0.128}\right)\right]}{2} = \frac{INT(188.29)}{2} = \frac{188}{2} = 94$$

and the corresponding coated wire diameter after the fourth pass through the fourth die is $$D_{pf(4)}=D_{0(4)}+K_{pass(4)}(D_{size(4)}-D_{0(4)})=917.1+0.128(940-917.1)=920.0.$$

Therefore, die set sizes for the four undercoating dies, and predicted coating build at each pass is provided.

The overcoat die sizes and predicted builds, of, for example, two overcoats applied over the undercoats using a fifth die and a sixth die, can be computed similarly to the above undercoat die size and respective enamel build computations. Equation (4) provides:

$$D_{i(n)} = \left(D_{0(n)}\left(\frac{D_f}{D_{0(n)}}\right)\right)^{1/N_r}$$

and so then for the first of two overcoat passes $D_{O(1)} = D_{Uf} = 920.2$ from Equation (1), $D_f = D_{Of} = 925.0$ from Equation (2), and $N_r = 2$. Therefore $$D_{O1} = 920.2\left(\frac{925.0}{920.2}\right)^{1/2} = 922.6$$

For the second of two overcoat passes $D_{O(2)} = D_{O1} = 922.6$, $D_f = D_{Of} = 925.0$ from Equation (2), and $N_r = 1$. Therefore $$D_{O2} = 922.6\left(\frac{925.0}{922.6}\right)^{1/1} = 925.0$$

Now applying Equation (6) for the fifth pass, or for the first overcoat pass, $D_{O(5)} = D_{pf(4)} = 920.0$, $D_{i(5)} = D_{O1} = 922.6$ and the undercoat build factor is, for example, 0.0746, then $$D_{Size(5)} = \frac{Int\left[0.2\left(\frac{922.6}{0.0746} + 920.0 - \frac{920.0}{0.0746}\right)\right]}{2} = \frac{INT(190.94)}{2} = \frac{191}{2} = 95.5$$

The corresponding coated wire diameter after passing through the fifth die, or after the first overcoating stage is found from Equation (5) as follows:

$$D_{pf(5)} = D_{0(5)} + K_{pass(5)}(D_{size(5)} - D_{0(5)}) = 920.0 + 0.0746(955 - 920) = 922.6.$$

Likewise, applying Equation (6) for the sixth pass, or for the second overcoat pass, $D_{O(6)} = D_{pf(5)} = 922.6$, $D_{i(6)} = D_{Of} = 925.0$ and the undercoat build factor $K_{pass(6)} = 0.0746$, then $$D_{Size(6)} = \frac{Int\left[0.2\left(\frac{925}{0.0746} + 922.6 - \frac{922.6}{0.0746}\right)\right]}{2} = \frac{INT(190.91)}{2} = \frac{191}{2} = 95.5$$

The corresponding coated wire diameter after passing through the sixth die, or after the second overcoating stage is found from Equation (5) as follows:

$$D_{pf(6)} = D_{0(6)} + K_{pass(6)}(D_{size(6)} - D_{0(6)}) = 922.6 + 0.0746(955 - 922.6) = 925.0.$$

Thus, the illustrative computations above efficiently calculate six die sizes for use in a six stage coating operation involving four undercoats of a first enamel, and two overcoats of a second enamel. The methodology set forth above, however, may be used to compute die sizes and predicted enamel builds for any number of dies and enamels of the same or different build factors. Further, calculations 104, 106, 108, 110 for one stage generate inputs for calculations of the next stage. That is, the calculations are iterative.

In another aspect of the invention, if die diameters and build factors are known for each of the die coating passes, the final wire diameter after n passes can be accurately predicted. Thus, die sizes may also be used as inputs 102 to method 100 and used to calculate 110 a final pass diameter at any of "n" coating stages while bypassing calculations 104, 106, and 108. By back substitution, a final wire diameter after an nth pass through an nth die, Equation (5) can be expressed as follows:

$$D_{pf(n)} = D_0(1 - K_{pass(1)})(1 - K_{pass(2)})(1 - K_{pass(3)}) \ldots \quad \text{(Eq. 7)}$$

$$(1 - K_{pass(n)}) + K_{pass(1)}D_{die(1)}(1 - K_{pass(2)})(1 - K_{pass(3)}) \ldots$$

$$(1 - K_{pass(n)}) + K_{pass(2)}D_{die(2)}(1 - K_{pass(3)})(1 - K_{pass(4)}) \ldots$$

$$(1 - K_{pass(n)}) + K_{pass(n-1)}D_{die(n-1)}(1 - K_{pass(n)}) +$$

$$K_{pass(n)}D_{die(n)}.$$

As an illustration, a 19.5 gauge (0.0339 inch) wire is coated with five undercoat passes and two overcoat passes through coating dies. The build factor ($K_u$) for each of the undercoats is 0.19, the build factor ($K_o$) for each of the overcoats is 0.14 and the dies include $D_1 = 365$, $D_2 = 370$, $D_3 = 375$, $D_4 = 375$, $D_5 = 380$, $D_6 = 375$ and $D_7 = 380$. Applying Equation (7):

$$D_{pf(7)} = D_0(1 - K_u)^5(1 - K_o)^2 + K_u D_1(1 - K_u)^4(1 - K_o)^2 +$$

$$K_u D_2(1 - K_u)^3(1 - K_o)^2 + K_u D_3(1 - K_u)^2(1 - K_o)^2 +$$

$$K_u D_4(1 - K_u)(1 - K_o)^2 + K_u D_5(1 - K_o)^2 +$$

$$K_o D_6(1 - K_o) + K_o D_7$$

Substituting the above values yields that $D_{pf(7)} = 366.2$ or 0.03662 inches. Thus the total enamel build is $D_{pf(7)} - D_0 = 366.2 - 339.0 = 27.2$ or 0.00272 inches.

Figure 9:
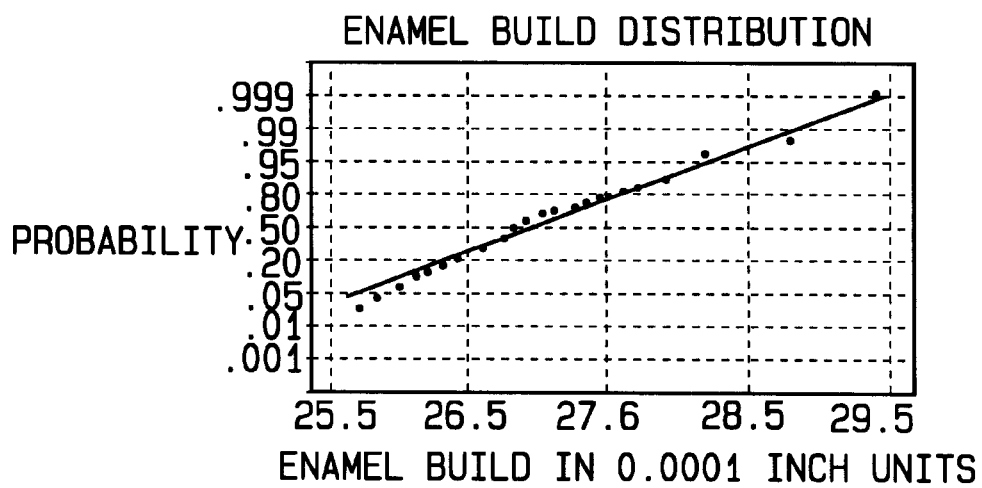
FIG. 9 is an exemplary enamel build distribution chart for magnet wire produced according to the present invention.

FIG. 9 is an exemplary final wire diameter variability chart for the preceding example. Measurements were taken from sixty wire spools, with a final diameter mean of 365.9 (0.03659 inches) as compared to the predicted diameter of 366.2. The measured final diameters are normally distributed with a small variance, and, notably, the wire was fabricated against a specification coating maximum thickness of 374 or 0.0374 inches. As FIG. 9 shows, the probability of the specification maximum being exceeded in this example is practically zero. Thus, scrapped magnet wire due to oversized final diameter is practically eliminated.

Figure 10:
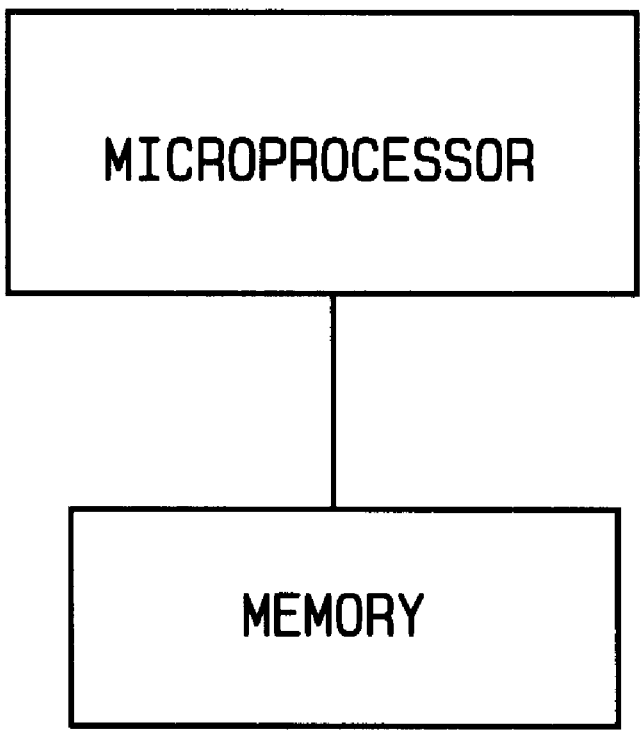
FIG. 10 is a block diagram of a system for predicting final magnet wire diameter and for selecting die sizes.

FIG. 10 is an exemplary enamel build distribution chart for magnet wire produced according to the present invention. FIG. 7 reveals an average enamel build of 26.9 in comparison to the predicted build of 27.2 The data is indicative of a stable process with very good sigma values.

FIG. 10 is a block diagram of a system including a microcomputer and a memory for predicting final magnet wire diameter and for selecting die sizes in accordance with method 100 (shown in FIG. 7). In one embodiment, microcomputer is a PC loaded with one of several known spreadsheet programs for manipulation of data. In alternative embodiments, custom software may be developed to accept inputs and generate desired die set size outputs and associated enamel builds and other items of interest in summary form. For example, a clearance may be calculated in each die by subtracting the incoming wire diameter from the computed (or selected) die size. If the clearance unduly restricted or excessively large so as to interfere with acceptable production of wire, adjustment to the die sizes and reevaluation of the input parameters may be necessary. Flags can set with computer software to alert an operator of an undesirable manufacturing tolerance in one or more of the dies.

The method set forth herein is adaptable to fabricating wire of noncircular cross section as well. Thus, other geometrical cross sectional shapes, such as, for example, square or rectangular shaped wire, may be formed according to the basic methodology set forth above. Also, the above described method and system are equally applicable to fabrication of other products requiring multiple pass coating fabrication.

While the invention has been described in terms of various specific embodiments, those skilled in the art will recognize that the invention can be practiced with modification within the spirit and scope of the claims.

What is claimed is:

1. A method for determining optimum enamel die sizes for each of a plurality of dies for fabricating magnet wire with reduced amounts of undercoating and overcoating enamel in a multi-stage fabrication process including at least one undercoating stage utilizing at least one undercoating enamel and an undercoating enamel die and at least one overcoating stage utilizing at least one overcoating enamel and an overcoating die, the wire fabricated in accordance with pre-selected specifications including minimum enamel coat build thickness and percent margin thickness of each of said undercoat and overcoat enamels; said method comprising the steps of:

obtaining a build factor constant for each undercoat and overcoat enamel used in the process; and calculating desired die set criteria for at least one of the stages based upon a relationship:

$$D_{pf(n)} = D_{0(n)} + K_{pass(n)}(D_{die(n)} - D_{0(n)})$$

where $D_{pf(n)}$=final wire diameter after the nth pass;
$D_{0(n)}$=initial wire diameter at the nth stage;
$K_{pass(n)}$=build factor for the nth pass; and
$D_{die(n)}$=die throat diameter of the nth stage.

2. A method in accordance with claim 1 wherein said step of calculating die set criteria comprises the steps of:

calculating a target final diameter of the magnet wire after completion of undercoat and overcoat operations;

computing an incremental diameter build at each undercoat and overcoat stage of magnet wire production based upon initial wire diameter entering the respective stage, the respective target final undercoat diameter when in an undercoating stage, the final target overcoat diameter when in an overcoating stage, the number of dies in undercoating operations when in an undercoating stage, and the number of dies in overcoating operations when in an overcoating stage; and computing an enamel die size at each undercoat and overcoat stage of magnet wire production based upon initial wire diameter entering the respective stage, the incremental diameter build for the respective stage, and the build factor for the enamel applied at each respective stage.

3. A method in accordance with claim 2 wherein each build factor is determined by the step of determining a fraction of wet enamel build which remains after evaporation of solvent and cure during a pass through a die.

4. A method in accordance with claim 2 wherein said step of calculating a target final diameter after completion of undercoat and overcoat operations is determined by the relationship:

$$D_f = D_0 + K_m\left(1 + \frac{K_p}{100}\right)$$

where $D_f$=final wire diameter;
$D_0$=initial wire diameter at the respective stage;
$K_m$=enamel build (min) for the respective stage; and
$K_p$=enamel build excess percentage at the respective stage.

5. A method in accordance with claim 4 wherein said step of computing an incremental diameter build for each undercoating and overcoating stage is governed by the relationship:

$$D_{i(n)} = D_{0(n)}\left(\frac{D_f}{D_{0(n)}}\right)^{\frac{1}{N_r}}$$

where $D_{i(n)}$=theorized diameter at the nth stage;
$D_{0(n)}$=initial wire diameter at the nth stage;
$D_f$=final undercoat or overcoat wire diameter; and
$N_r$=number of remaining passes at the nth stage.

6. A method in accordance with claim 5 wherein the step of computing an enamel die size at each undercoat and overcoat stage is governed by the relationship $$D_{Size(n)} = \frac{Int\left[0.2\left(\frac{D_{i(n)}}{K_{(n)}} + D_{0(n)} - \frac{D_{0(n)}}{K_{(n)}}\right)\right]}{2}$$

where $D_{pf(n)}$=final wire diameter after the nth pass;
$D_{0(n)}$=initial wire diameter at the nth stage;
$K_{pass(n)}$=build factor for the nth pass; and
$D_{die(n)}$=die throat diameter of the nth stage.

7. A system for determining optimum enamel die sizes for each of a plurality of dies for fabricating magnet wire with reduced amounts of undercoating and overcoating enamel in a multi-stage fabrication process including at least one undercoating stage utilizing at least one undercoating enamel and an undercoating enamel die and at least one overcoating stage utilizing at least one overcoating enamel and an overcoating die, the wire fabricated in accordance with pre-selected specifications including minimum enamel coat build thickness and percent margin thickness of each of said undercoat and overcoat enamels, and each undercoat and overcoat enamel having a build factor constant, said system comprising:

a microprocessor and a memory together configured to accept calculation inputs comprising nominal bare wire diameter used to produce the magnet wire, undercoat and overcoat specification minima, undercoat and overcoat percentage margins, build factors for each undercoat and overcoat material, and a number of undercoat dies and a number of overcoat dies, said microprocessor further configured to calculate undercoat and overcoat die sizes based upon said inputs.

8. A system in accordance with claim 7 wherein said system is configured to generate the undercoat and overcoat die sizes for at least one of the stages based upon a relationship:

$$D_{pf(n)} = D_{0(n)} + K_{pass(n)}(D_{die(n)} - D_{0(n)})$$

where $D_{pf(n)}$=final wire diameter after the nth pass;
$D_{0(n)}$=initial wire diameter at the nth stage;
$K_{pass(n)}$=build factor for the nth pass; and
$D_{die(n)}$=die throat diameter of the nth stage.

9. A system in accordance with claim 8 wherein said microprocessor and memory are further configured to generate calculation outputs comprising predicted final undercoat and overcoat builds and a final wire diameter after undercoating and overcoating operations.

10. A system in accordance with claim 7 wherein said microprocessor is configured to calculate a target final diameter of the magnet wire after completion of undercoat and overcoat operations.

11. A system in accordance with claim 10 wherein said target final diameter after completion of undercoat and overcoat operations is determined by the relationship:

$$D_f = D_0 + K_m \left(1 + \frac{K_p}{100}\right)$$

where $D_f$=final wire diameter;
$D_0$=initial wire diameter at the respective stage;
$K_m$=enamel build (min) for the respective stage; and
$K_p$=enamel build excess percentage at the respective stage.

12. A system in accordance with claim 7 wherein said microprocessor is configured to compute an incremental diameter build at each undercoat and overcoat stage of magnet wire production based upon initial wire diameter entering the respective stage, the respective target final undercoat diameter when in an undercoating stage, the final target overcoat diameter when in an overcoating stage, the number of dies in undercoating operations when in an undercoating stage, and the number of dies in overcoating operations when in an overcoating stage.

13. A system in accordance with claim 12 wherein an incremental diameter build for each undercoating and overcoating stage is governed by the relationship:

$$D_{i(n)} = D_{0(n)} \left(\frac{D_f}{D_{0(n)}}\right)^{\frac{1}{N_r}} \quad \text{(Eq. 4)}$$

where $D_{i(n)}$=theorized diameter at the nth stage;
$D_{0(n)}$=initial wire diameter at the nth stage;
$D_f$=final undercoat or overcoat wire diameter; and
$N_r$=number of remaining passes at the nth stage.

14. A system in accordance with claim 7 wherein said microprocessor is configured to compute an enamel die size at each undercoat and overcoat stage of magnet wire production based upon initial wire diameter entering the respective stage, the incremental diameter build for the respective stage, and the build factor for the enamel applied at each respective stage.

15. A method in accordance with claim 14 wherein an enamel die size at each undercoat and overcoat stage is governed by the relationship $$D_{Size(n)} = \frac{Int\left[0.2\left(\frac{D_{i(n)}}{K_{(n)}} + D_{0(n)} - \frac{D_{0(n)}}{K_{(n)}}\right)\right]}{2}$$

where $D_{pf(n)}$=final wire diameter after the nth pass;
$D_{0(n)}$=initial wire diameter at the nth stage;
$K_{pass(n)}$=build factor for the nth pass; and
$D_{die(n)}$=die throat diameter of the nth stage.

* * * * *